Oct. 26, 1965
R. L. SMIRL
3,214,084
ELECTROMAGNETIC FRICTION DEVICE AND
COMPRESSOR CONTROL FOR SAME
Filed March 27, 1961
2 Sheets-Sheet 1
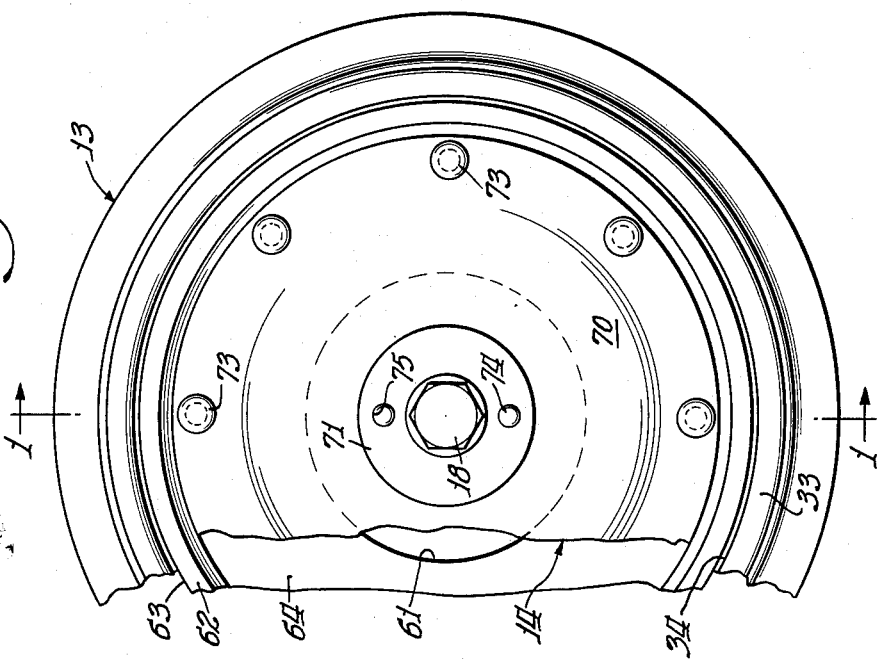
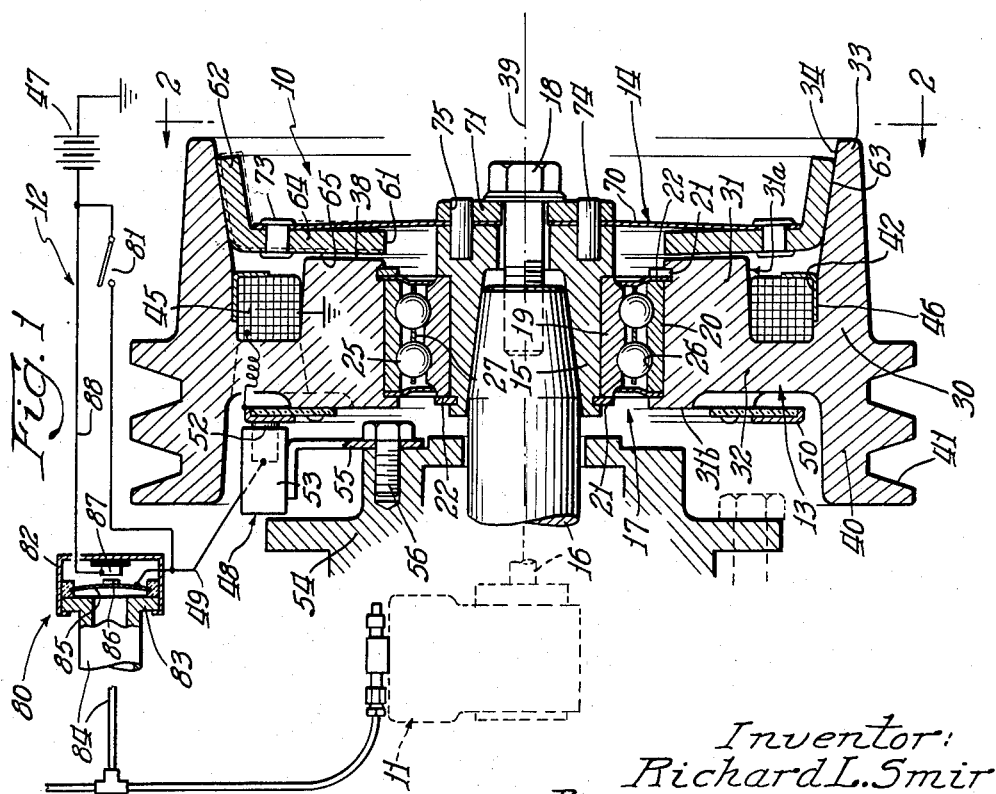
Inventor:
Richard L. Smirl
By: Joseph W. Malleck Atty.

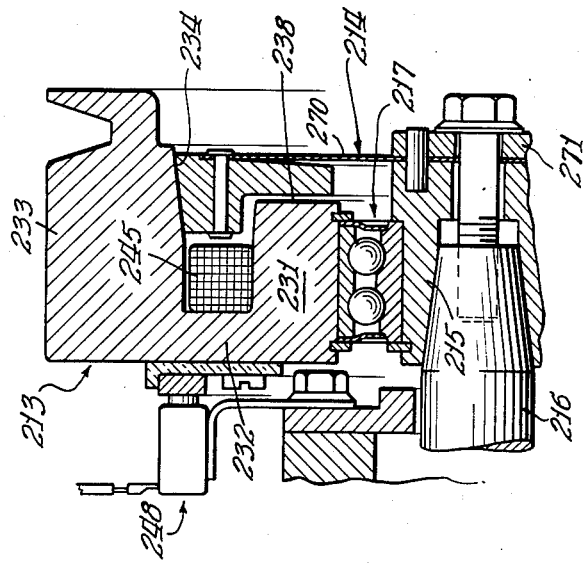

United States Patent Office 3,214,084
Patented Oct. 26, 1965

3,214,084
ELECTROMAGNETIC FRICTION DEVICE AND COMPRESSOR CONTROL FOR SAME
Richard L. Smirl, La Grange, Ill., assignor to Borg-Warner Corporation, Chicago, Ill., a corporation of Illinois
Filed Mar. 27, 1961, Ser. No. 98,587
11 Claims. (Cl. 230—15)

This invention relates to electrically operated friction devices and controls thereof, and more particularly to an improved electromagnetic clutch construction which uniquely weds the desirable characteristics of two known types of electromagnetic clutch constructions to provide unprecedented durability and economy of construction.

Electromagnetic clutch devices have been found to be particularly desirable in applications such as automobile air-conditioning systems in which the transmission of power to a compressor must be controlled by a device having considerable compactness. Such applications place particular requirements on the clutch in that they must be of more simple and economical construction to be commensurate with the aims of modern automobile design; the clutch in such systems may be engaged for long periods of time and must be sufficiently durable to withstand use with little signs of wear. Although known electromagnetic clutches have proved to be successful in meeting the above requirements, the instant invention is concerned with an improvement in construction which greatly frees the manufacturer as to the selection of construction materials and substantially reduces manufacturing costs without sacrificing ability to handle load requirements.

Heretofore, there has existed at least two recognizable types of electromagnetic clutch constructions, one herein called the "cone" variation and the other herein called the "disc" variation. In the cone type, interengaging surfaces or frictional working faces between engageable rotatable clutch elements are conically shaped and by their inherent geometrical configuration require less axial force to develop sufficient frictional locking of the working faces for conjoint rotation. In the disc type, the engaging surfaces or frictional working faces are generally disposed normally to the axis of the engageable rotatable clutch elements and in instances where the flux linkages pass through the working faces the armature pull is entirely axial. The disc construction is particularly advantageous due to the facility it provides for large axially directed flux linkages and thereby providing for a stronger clutch engaging force.

It is a primary object of this invention to provide an improved electromagnetic friction device which uniquely combines the desirable features of both the disc and cone type electromagnetic friction devices. A particular feature of this invention, pursuant to this object, is the provision of an armature ring element having a generally L-shaped radial cross-section in which the element has one annular pole piece with a frusto-conical face and another annular pole piece with a flat disc-like face disposed normally to the clutch axis.

Another object of this invention is the provision of a more durable and economical electromagnetic friction device. Of particular concern is the ability to incorporate cheaper construction materials for the core ring element without adversely affecting the performance characteristics of the device. To this end, it has been found that by combining several structural features, equivalent torque requirements can be maintained while using cast iron. The use of cast iron has heretofore not been desirable because of the maximum limit on flux permeability. Steel, being more expensive, has been thought more suitable. However, if the following are provided: the working faces of the clutch are conically shaped, at least one face is constructed of a ferromagnetic material having a greater coefficient of friction than the material of the armature, the flux path is threaded through the working faces, and the primary engaging force is provided between disc-type pole pieces, then equivalent torque requirements can be maintained while permitting use of materials such as cast iron.

Also of particular concern to economy and durability is the obviation of damage occurring to the bearing supports of an electromagnetic friction device having a belt driven core ring element which is rotatably supported on an output shaft by such bearings. When the armature ring element of such a clutch construction is engaged with the core ring element, providing a direct mechanical link between the elements for conjoint rotation, the relatively inactive bearing at such stage may be subject to brinneling or other damage by unbalanced or vibrational loads transmitted from the belt drive. To this end, a particular feature of this invention comprises the provision of a resilient flexible mounting diaphragm for the armature ring element which not only isolates such unbalanced vibrational loads, but also serves to retract the armature ring element upon de-energization of the coil means within the core ring element. The diaphragm is cup-shaped in the unflexed condition to afford better operating characteristics than have heretofore been known.

Still another object of this invention is the provision of unique and simplified wear adjusting means to automatically maintain a predetermined air gap between the armature and core ring elements which co-operates with the preceding described construction to provide a more controlled gap than has been possible. A particular feature of this construction pursuant to this object is the provision of a two part armature ring element having the second part threadably received within the first part and which is adapted to back off a greater distance from the core ring element upon touching thereagainst; the flux path is threaded through both parts of the armature providing better operation.

Yet another object of this invention is the provision of control means for the electromagnetic clutch device used with an automobile air-conditioning unit, in which the manual electrical switch means for energizing the friction device may be by-passed when a predetermined pressure of the compressor is achieved. It is contemplated that such pressure responsive electrical by-pass means will maintain the clutch in the engaged condition when the compressor pressure reaches such a magnitude that it would be undesirable to engage or disengage the clutch at such stages.

Other objects and advantages of this invention will become apparent from the following detailed description taken in connection with the accompanying drawings, in which:

FIG. 1 is a central sectional elevational view of an electrically operated friction device and a partially schematic illustration of a compressor system with which the friction device is used, said friction device construction and system embodying the principles of this invention;

FIG. 2 is a view taken substantially along line 2—2 of FIG. 1;

FIG. 3 is a view like FIG. 1, illustrating a slightly modified form of the invention;

FIG. 4 is sitll another embodiment of the instant invention.

Referring now to the drawings and more particularly to FIG. 1, there is shown an electromagnetic friction device 10 adapted to transmit rotative power and operate the compressor 11, here shown to be of the type used with an automotive vehicle air-conditioning system (not shown). An electrical control system 12 is provided to operate the electromagnetic friction device both in accordance with the conditions of the air-conditioning unit and in accordance with manual means.

The electromagnetic friction device 10 comprises generally rotatable core ring element 13 and rotatable armature ring element 14 which is shiftable axially into frictional engagement with the core ring element 13. The core ring element 13 is rotatively mounted by a bearing means 17 upon a cylindrical hub 15 fastened to an output shaft 16, the bearing means 17 being disposed between the hub and element 13; the output shaft 16 is rotatively carried by the compressor 11 and is adapted to operate the compressor upon being driven. The outer end of the output shaft 16 is tapered to receive the cylindrical hub 15 which is to mate with such end and is fixedly secured thereto by cap screw 18. The bearing means 17 comprises inner and outer races 19 and 20, each race being secured against axial movement by co-operation of snap rings 21 and shoulders 22 provided respectively on the outer surface of the hub 15 and the inner surface of core ring element 13. A plurality of ball-bearings 25 are received within annular grooves 26 provided in internal surface of the races and a cage 27 maintains the ball-bearings in proper alignment within the grooves.

The body of the core ring element 13 comprises an outer section 30 and an inner section 31 radially spaced apart by an integral web portion 32 located to one side of the section. The web portion 32 is of smaller cross-sectional area than either sections 30 and 31 to provide a flux choke and limit the magnetic flux linkages available at the polarity thereof. The outer section 30 has an annular extension 33 which overhangs the side 31a of the inner section. Extension 33 forms a pole piece and carries a pole face 34 defined as a frusto-conical surface on the interior of the extension 33. The conical surface is tapered radially inwardly toward the interior of the friction device 10.

The side 31a of the inner section forms another pole piece and carries a pole face 38 defined by a flat annular surface disposed normally to the axis 39 of the output shaft. Pole face 38 is smaller in area than pole face 34 for providing a lower pole face flux density at surfaces which act as frictional working faces.

The outer periphery of section 30 is provided with an enlarged neck portion 40 within which are provided a pair of V-shaped annular grooves 41 into which are inserted a strap drive or input means (not shown) for rotatably driving the core ring element.

Within the cavity 42 provided between the inner and outer radially spaced sections 30 and 31, an electrical annular coil means 45 is inserted and is held therein by an annular bracket 46; such coil means may be comprised of copper wiring, aluminum foil, or the like. The coil means 45 is suitably connected to a D.C. power source 47 by an electrical transfer means 48, lead wire 49 and electrical control system 12. The electrical transfer means 48 comprises a flat annular slip ring 50 which is fixedly secured to the side 31b of the inner section of the core ring element 13, electrical brushes 52 carried by holder 53 mounted upon the stationary element 54 of the compressor by a bracket 55 and a plurality of cap screws 56. The brush and holders may be constructed of suitable carbon material and the slip ring may be constructed of brass.

The armature ring element 14 comprises a cup member having a central opening 61 and has a radial cross-secttion which is L-shaped. One leg 62 of the "L" forms a pole piece and carries a pole face 63 which is in the form of a frusto-conical configuration and is adapted to mate with the pole face 34 of the core ring element 13. The other leg 64 of the "L" cross-section forms the other pole piece and carries a pole face 65 in the form of a flat annular surface disposed normally to the axis 39 of the output shaft.

The armature ring element 14 is carried by a flexible resilient diaphragm 70 having its inner central portion clamped between the end of the hub 15 and a hub cover 71 by the cap screw 18. The outer margin or periphery of the diaphragm 70 is fastened to the outwardly facing side of the cup member by a plurality of circumferentially spaced rivets 73. A plurality of drive pins 74 are received in co-operating openings 75 provided in the hub and hub cover 71 to drivingly connect the diaphragm to the hub 15 and the hub cover 71.

In operation, the coil means 45 is energized producing a circuitous flux path as indicated by dotted outline in FIG. 1, which threads through the pole pieces and pole faces of the core ring element and armature ring element. In the disengaged condition of the clutch, the diaphragm supporting the armature ring element is in an unflexed slightly cup-shaped configuration, as shown in dotted outline in FIG. 1, which resiliently retracts the faces 63 and 65 of the armature ring element away from the faces 34 and 38 of the core ring element. Upon energization of the coil means, the armature ring element is forced to move so that the face 63 frictionally engages the face 34 in a smooth interlocking manner. The diaphragm is deflected and flexed into a greater cup-shaped condition as shown in full line in FIG. 1. In the engaged condition, the leg 64 of the armature ring element is spaced slightly away from the face 38 of the core ring element to provide an air gap affording reluctance to the passage of residual flux upon de-energization of the coil means 45; the pole faces 65 and 38 and the defined air gap therebetween constituting a reluctance means.

Among the advantages provided by this invention is the manner in which the construction of the core ring element and armature ring element combines the features of a disc type and a cone type electromagnetic clutch construction. As shown in FIG. 1, one pole piece of each element co-operates in the disc type manner whereby substantial flow of flux may be transferred in an axial direction to provide the primary clutch engaging effect by solenoid action and one pole piece of each element cooperates to act in a cone type manner which provides for an augmented clutch engaging force by induced magnetization of the frictional engaging faces 63 and 34 to aid in locking against relative rotation between the elements.

The core ring element, illustrated in FIGS. 1–4, is constructed of cast iron and the armature ring element of mild steel; the use of cast iron is permitted because of the use of conical working faces having the flux linkages passing therethrough, large area faces for frictional engagement, use of differential materials having different coefficients of friction, and primary pole faces which are disposed normally to the clutch axis, all of which contribute to reducing the required flux permeability of the core ring element.

It is significant to point out that the flexible resilient diaphragm 70 serves three purposes according to the disclosed construction. First, it operates to retract the armature ring element upon de-energization of the coil means 45. To do so the diaphragm is constructed so that it is saucer-shaped in the unflexed condition. This saucer shape may be provided by first stamping the diaphragm from spring steel blanks resulting in a flat shape and then providing the saucer shape by riveting the outer periphery thereof to the slightly conical back face of the armature ring element. The outer periphery is caused to conform to such angled face of the armature ring element and assume the saucer shape as in FIG. 1. Such cup shape has proved to give a more desired retraction force curve as indicated by test results. Secondly, the diaphragm isolates vibrations and unbalanced loads transmitted to the core ring element by the strap drive means during the engaged condition of the clutch. The isolation of such vibrational forces is of particular importance during the engaged condition of the clutch since a substantial portion of the torque load is transmitted from the core ring element to the armature ring element via the diaphragm and thereby leaving the bearing means relatively inactive in supporting the core ring element. During the clutch engaged condition, vibrations and unbalanced loads have proved to cause brinneling and damage to the accurately formed ball-bearings within the bearing means 17. However, by the isolation of such vibrations and unbalanced loads, damage to these ball-bearings is obviated. Thirdly, the diaphragm provides a direct mechanical link between the armature and output shaft and carries torque loading.

A serious condition is usually encountered with the use of electromagnetic clutches for air-conditioning units used in automotive vehicles. After the compressor has been running for some time and has developed large torque loads, the operator of the automotive vehicle may manually disengage the clutch for deactivation of the air-conditioning system. In a very short time the operator may attempt to re-engage the clutch and activate the air-conditioning system before the compressor pressure has reduced itself and thereby the accompanying torque loads which must be taken up by the clutch. In such a condition, re-engagement of the clutch would require extreme re-engaging forces and would necessitate special construction for accompanying temperature and wear conditions. Pursuant to the aims of economy, the present invention permits the electromagnetic clutch device to be designed for relatively small engaging loads and has a pressure sensing control system which eliminates any possibility of clutch device being engaged and disengaged when the compressor pressure has gone beyond a predetermined level.

For this purpose, a pressure responsive switch 80 is electrically connected in parallel with a conventional manually operated switch 81 of the electrical control system 12 having a D.C. battery source. The pressure responsive switch 80 comprises a cylindrical casing 82 which fits about a flange 83 of a conduit 84 connected to the fluid refrigerant medium of the compressor. Within the casing 82 is mounted a flexible disc member 85 which is subjected to compressor pressure and adapted to flex sideways in response to such pressure. Mounted centrally on the disc is an electrical contact member 86 adapted to engage a cooperating stationary contact member 87 fixedly secured to the end wall of the casing 82. The contact 86 is connected to lead wire 49 and the stationary contact point is connected to lead wire 88 communicating with the energy source. Thus it can be seen, that should the pressure of the compressor rise above a certain level, preferably 35-50 p.s.i., the disc member 85 will be caused to bring together the contact points and provide an electrical connection from the battery to the coil means 45 of the electromagnetic clutch device thereby by-passing the manual switch 81 and precluding disengagement of the clutch.

In FIG. 3, an alternative embodiment is illustrated wherein similar parts have similar part numbers preceded by the numeral "1." The core ring element 113 comprises inner and outer sections 131 and 133 interconnected by web portion 132. The outer section is constructed so that it has a greater proportion of mass to afford a desired flywheel effect for the compressor whereby transmitted torsional vibrations from the vehicle engine are dampened at critical speed ranges of the compressor which normally would result in rumble of certain constructions. The peak torque requirements are in effect reduced. A coil means 145 is seated between the sections and is adapted to induce magnetic flux through annularly spaced pole pieces, one carrying the frusto-conical pole face 134 and the other carrying a flat annular pole face 138 disposed normally to the axis of the friction device and output shaft 116. The core ring element 113 is mounted upon the output shaft 116 in the same manner as above described by use of a hub 115 and ball-bearing means 117.

The armature ring element 114, however, is comprised of two parts. The first part 190 is annularly shaped having its outer surface formed as a frusto-conical surface 191 and adapted to frictionally engage with the frusto-conical pole face 134 of the core ring element 113. The cylindrical internal surface 192 of the first part is threaded entirely therealong. A second part 194 is formed as an annular ring member having an outer surface 195 threadably received within the inner threaded surface 192 of the first part. The second part is adapted to adjust itself on the first part to maintain a pre-determined minute air gap between pole faces 165 and 138. An annular groove 196 is provided in the outer surface 195 of the second part for receiving an annular drag ring 198 which is adapted to maintain the first part in a fixed relative position to the second part when no appreciable turning force is applied to the second part.

In operation of the construction of FIG. 3, the armature ring element 114 is moved axially into engagement with the core ring element 113 upon energization of the coil means 145 whereby the frusto-conical pole faces 134 and 191 are frictionally engaged. The second part may be caused to touch or slightly drag against the flat pole face 138 when the working faces 191 and 134 wear a sufficient increment. The second part will then be caused to screw outwardly of the device to back off from the pole face 138 and reinstitute the proper air gap since the threads on surface 192 are accommodated to work opposite to rotation of the core ring element. The amount of backing off will be controlled more than by known devices since the threadably engaged surfaces have flux passing therethrough which induces magnetism and provides an augmented drag therebetween to obtain a more minute air gap.

The embodiment of FIG. 4 is similar to that of the preferred embodiment, except that the armature ring element and core ring element are adapted to provide a more compact unit. The frusto-conical face 234 is located axially inwardly of the normal surface 238 so that at least one half of the area of face 234 is axially inwardly thereof.

While I have described my invention in connection with one specific embodiment and one alternative embodiment thereof, it is to be understood that these are by way of illustration and not by way of limitation and the scope of my invention is defined solely by the appended claims which should be construed as broadly as the prior art will permit.

What is claimed is:

1. An electromagnetic friction device, comprising: an output shaft; a core ring element of ferromagneic material having spaced inner and outer annular sections and having an annular web portion interconnecting said sections at one side thereof, said outer section carrying a pole portion having a frusto-conicol pole face tapering radially inwardly toward the interior of said core ring element, said inner section having a pole portion carrying a flat annular pole face disposed normally to the axis of said core ring element; electrical coil means disposed between said outer and inner sections of said core ring element and adapted to be energized by a suitable source of direct current energy to provide a flux path therethrough; bearing means mounting said core ring element on said output shaft for relative rotation therebetween; an armature ring element having mounting means drivingly connecting said armature ring element to said output shaft for rotation therewith, said armature ring element comprising a cup-shaped member having a central opening and having an L-shaped radial cross-section, one leg of said "L" forming a pole piece carrying a frusto-conical pole face adapted to frictionally engage with the frusto-conical face of said core ring element and through which all of said flux passes, the other leg of said "L" forming a pole portion carrying a pole face adapted to be brought adjacent the flat annular pole face of said core ring element with a predetermined air gap therebetween when the clutch is in the engaged position and through which all of said flux passes; said mounting means for said armature ring element being resilient in an axial direction of said clutch whereby said armature ring element may be resiliently retracted from said core ring element upon de-energization of said coil means, and power means connected to said outer section of said core ring element for rotatively driving same.

2. An electromagnetic friction device as in claim 1, in which one of said web portion, said outer section, and said inner section of the core ring element is of smaller cross-sectional area than the others to provide a flux choke whereby the area of said pole faces may be greater in area than the area of said choke for providing high pole face flux density and providing improved frictional locking.

3. An electromagnetic friction device as in claim 1, in which said resilient mounting means for said armature ring element comprises a flexible diaphragm which is saucer-shaped in the unflexed and disengaged condition of the device and is provided with greater deviation from a flat plane upon being flexed to the engaged condition of the device.

4. An electromagnetic friction device as in claim 1, in which said core ring element is comprised of cast iron and said armature ring element is comprised of ferro-magnetic material greater in magnetic permeability than cast iron.

5. An electromagnetic friction device, comprising: an input means and an output shaft; a core ring element connected to said input means and being of ferro-magnetic material having spaced annular pole portions, one of said pole portions having a frusto-conical pole face and the other of said pole portions having a flat annular pole face disposed normally to the axis of said core ring element; bearing support means between said output shaft and said core ring element for permitting relative rotation therebetween; an armature ring element of ferro-magnetic material having a pair of spaced annular pole portions carrying pole faces adapted to respectively mate with the pole faces of said core ring element; a resilient diaphragm fixedly connected to said output shaft and secured to said armature ring element; and electrical coil means disposed within said core ring element and adapted to be energized for providing a circuitous flux path which threads through said pole portions and said pole faces, said resilient diaphragm supporting said armature ring element and being adapted to flex axially of said friction device so as to retract said armature ring element away from said core ring element upon de-energization of said coil means and being adapted to absorb and obviate unbalancing loads applied to said core ring element when the friction device is in the engaged condition and being adapted to transmit the entire rotative drive between said input means and said output shaft.

6. An electromagnetic friction device as in claim 5, in which said input means comprises a belt means rotatably driving said core ring element, said bearing support means comprises a pair of annular races disposed between said core ring element and said output shaft having a plurality of ball-bearings therebetween, and said resilient diaphragm being disposed normally to the axis of said output shaft and having said armature ring element fastened to its outer periphery, said resilient diaphragm being adapted to isolate vibration and unbalanced loads applied to said core ring element and armature ring element during the engaged condition of said friction device so as to prevent brinneling or distortion of said ball-bearings during such engaged condition.

7. An electromagnetic friction device, comprising: a core ring element of ferro-magnetic material having a pair of spaced annular pole portions, one pole portion carrying a frusto-conical pole face and the other of said pole pieces carrying a flat annular pole face disposed normally to the axis of said core ring element; electrical coil means disposed within said core ring element adapted for being energized; an armature ring element of ferro-magnetic material comprising a first annular part having a pole portion with a frusto-conical pole face for frictionally engaging a frusto-conical pole face of said core ring element, said first part having an inner cylindrical threaded surface, said armature ring element comprising a second annular part having an outer cylindrical threaded surface adapted to threadably engage the inner surface of said first part and having a flat annular pole face adapted to be brought into confronting relation with the flat annular pole face of said core ring element, said coil means when energized being adapted to produce a circuitous flux path which threads through said pole portions and said pole faces and threaded surface; and means mounting said core ring element and said armature ring element for relative rotation therebetween, said second part of said armature ring element being threadably related to the first part thereof so that upon engagement of said armature ring element with said core ring element the second part frictionally engages with the annular pole face of said core ring element so that rotational momentum will be imparted to it causing it to adjust slightly within its threaded position and thereby back away from said annular pole face of said core ring element providing a minute air gap therebetween, said air gap being constant for each application of the clutch device in spite of wear between frictional engaging surfaces.

8. An electromagnetic friction device as in claim 7, in which the outer surface of said second part of the armature ring element has an annular slot carrying an insert ring having a coefficient of friction greater than the ferro-magnetic material of which said armature ring element is made so as to retain that second part in position to which it is moved relative to the first part until it is again frictionally engaged by the flat annular pole face of said core ring element.

9. A clutch control system for an automotive vehicle air-conditioning unit, comprising, in combination: an output shaft; a compressor rotatably carrying said output shaft and adapted to be driven thereby; input power means; an electromagnetic clutch device interconnecting said input power means and said output shaft for selective conjoint rotation therebetween; said electro-magnetic friction device having an electrical energy source; a manual switch to selectively control the energization of said device and a pressure switch responsive to pressure generated by said compressor and in parallel with said manual switch to override the effect of said manual switch to maintain said electro-magnetic friction device in the engaged condition in response to a predetermined pressure.

10. An electromagnetic friction device, comprising: an output shaft; a core ring element of ferro-magnetic material having a pair of spaced annular pole portions, one terminating in a face disposed generally normally to the axis of said core ring element, the other of said pole portions terminating in a frusto-conical face concentric with the axis of said core ring element; an armature ring element of ferro-magnetic material having a pair of spaced annular pole portions carrying pole faces adapted to mate with the faces of said core ring element, said armature also having a third annular surface of frusto-conical configuration; bearing means mounting said core ring element on said output shaft for relative rotation therebetween; a normally flat resilient diaphragm drivingly connected to said output shaft and having its outer periphery generally secured to said third annular surface of said armature to impart a saucer-shape to said diaphragm in the disengaged condition of the elements; coil means disposed within said core ring element and suitably connected to an energy source for providing a circuitous flux path which threads through said pole portions and pole faces to cause said frusto-conical pole faces to frictionally engage resulting in conjoint rotation of said elements; and reluctance means between said armature and core ring elements to impede residual flux upon de-energization of said coil means.

11. An electromagnetic friction device as in claim 10, in which said third annular surface faces outwardly of the device and is located radially inwardly of the frusto-conical pole face of said armature ring element.

References Cited by the Examiner

UNITED STATES PATENTS

| | | | |
|---|---|---|---|
| 1,056,243 | 3/13 | Whitcomb. | |
| 1,621,383 | 3/27 | Thropp | 188—164 X |
| 1,629,304 | 5/27 | Price. | |
| 1,825,686 | 10/31 | Walker. | |
| 2,070,813 | 2/37 | Stearns et al. | |
| 2,398,838 | 4/46 | Miller et al. | 151—7 X |
| 2,692,035 | 10/54 | Rabinow. | |
| 2,851,865 | 9/58 | Jacobs. | |
| 2,986,251 | 5/61 | Pitts | 192—84 |

DAVID J. WILLIAMOWSKY, *Primary Examiner.*

THOMAS J. HICKEY, *Examiner.*